US012681430B2

(12) United States Patent
Kondo et al.

(10) Patent No.: US 12,681,430 B2
(45) Date of Patent: Jul. 14, 2026

(54) IMAGE FORMING APPARATUS

(71) Applicant: CANON KABUSHIKI KAISHA, Tokyo (JP)

(72) Inventors: Keita Kondo, Tokyo (JP); Kenichi Tanaka, Ibaraki (JP); Atsushi Yoshida, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 80 days.

(21) Appl. No.: 18/937,370

(22) Filed: Nov. 5, 2024

(65) Prior Publication Data

US 2025/0060700 A1 Feb. 20, 2025

Related U.S. Application Data

(63) Continuation of application No. 18/185,562, filed on Mar. 17, 2023, now Pat. No. 12,169,387.

(30) Foreign Application Priority Data

Mar. 28, 2022 (JP) ................................ 2022-051436

(51) Int. Cl.
*G03G 21/20* (2006.01)
*G03G 15/20* (2006.01)

(52) U.S. Cl.
CPC ....... *G03G 21/206* (2013.01); *G03G 15/2028* (2013.01)

(58) Field of Classification Search
CPC ......................... G03G 21/206; G03G 15/2028
See application file for complete search history.

(56) References Cited

U.S. PATENT DOCUMENTS

2020/0026224 A1* 1/2020 Mori ...................... B65H 5/023
2023/0305488 A1* 9/2023 Kondo .............. G03G 15/2021

FOREIGN PATENT DOCUMENTS

JP H0986754 A 3/1997
JP 2017207648 A 11/2017

OTHER PUBLICATIONS

Notice of Allowance issued in U.S. Appl. No. 18/185,562 mailed Aug. 21, 2024.

* cited by examiner

*Primary Examiner* — Stephanie E Bloss
*Assistant Examiner* — Michael A Harrison
(74) *Attorney, Agent, or Firm* — ROSSI, KIMMS & McDOWELL LLP

(57) ABSTRACT

An image forming apparatus includes an image forming unit, a fixing unit including a rotary member pair configured to form a first nip portion, a cooling unit configured to form a second nip portion, a drive unit, an obtaining unit configured to obtain information regarding torque of the drive unit, and a control unit. In a state where the recording material is nipped by the first nip portion and the second nip portion, if the information is equal to or less than a threshold value, the control unit is configured to set a conveyance speed of the cooling unit at a first speed larger than a conveyance speed of the fixing unit, and if the information is larger than the threshold value, the control unit is configured to set the conveyance speed of the cooling unit at a second speed smaller than the conveyance speed of the fixing unit.

12 Claims, 8 Drawing Sheets

IMAGE FORMING APPARATUS

BACKGROUND OF THE INVENTION

Field of the Invention

This disclosure relates to an image forming apparatus, such as a printer, a copy machine, a facsimile, or a multi-functional machine, using an electrophotographic system.

Description of the Related Art

In electrophotographic image forming apparatuses, a toner image formed on a recording material such as paper is fixed by heating and pressing the toner image in a fixing unit. The fixing of the toner image in the fixing unit is performed by a fixing roller heated by a heater and the like, and a press roller which comes into contact with the fixing roller and forms a fixing nip portion for nipping and conveying the recording material. Since the recording material is heated when passing through the fixing nip portion, a temperature of the recording material is increased after having passed through the fixing nip portion. In a case where a large number of the recording materials, which have been conveyed in a state kept at a high temperature after the fixing of the toner image, are stacked on a loading portion, there is the fear that the stacked recording materials may be adhered to each other by the toner.

So as to suppress this, a cooling unit which cools the recording material conveyed from the fixing unit is disposed. The cooling unit includes conveyance belts (called as cooling belts) cooled by a heat sink and the like, and decreases the temperature of the recording material via a cooling nip portion formed by the colling belts. The recording material on which the toner image has been fixed by the fixing unit is nipped and conveyed in a state where a leading edge of the recording material reaches the cooling nip portion before a trailing edge of the recording material has passed through the fixing nip portion. Further, the recording material which has been cooled by the cooling unit is nipped and conveyed in a state where the leading edge of the recording material reaches an after-conveyance roller unit before the trailing edge of the recording material has passed through the cooling nip portion.

Incidentally, since an outside diameter of the fixing roller heated by the heater and the like is sometimes changed by thermal expansion, variations in a conveyance speed of the recording material by the fixing unit (hereinafter referred to as a fixing conveyance speed) are likely to occur. When this occurs, the recording material is curved (so-called loop) during the conveyance between a transfer nip portion, for transferring the toner image onto the recording material, and the fixing nip portion, image defects such as a gloss unevenness in which the gloss of the toner image is uneven occur. Therefore, apparatuses which suppress the generation of the loop in the recording material after the fixing by performing speed control which increases and decreases the fixing conveyance speed are suggested (refer to Japanese Patent Laid-Open NOS. H09-86754 and 2017-207648).

However, hitherto, since the fixing conveyance speed is decreased, sometimes, a conveyance speed of the recording material by the cooling unit (hereinafter referred to as a cooling conveyance speed) becomes relatively faster in comparison with the fixing conveyance speed so as to increase a speed difference from the fixing conveyance speed. In such a case, since the recording material is conveyed while being pulled by the cooling belts from the fixing unit, the torque of the cooling belts is increased. Then, if the trailing edge of the recording material has passed through the fixing nip portion in a state where the torque of the cooling belts is kept in large, the cooling conveyance speed may become temporarily faster than a conveyance speed of the recording material by an after-conveyance roller unit (hereinafter referred to as an after-conveyance speed). Since, when that happens, the loop is generated in the recording material between the cooling unit and the after-conveyance roller unit, there is the fear of the occurrence of the image defects due to the loop.

The present disclosure provides the image forming apparatus which can convey the recording material without generating the loop in the recording material even in a case where torque fluctuations occur in the cooling unit in response to changes in the cooling conveyance speed during the conveyance of the recording material.

SUMMARY OF THE INVENTION

According to one aspect of the present invention, an image forming apparatus includes an image forming unit configured to form a toner image on a recording material, a fixing unit configured to nip and convey the recording material on which the toner image has been formed by the image forming unit while applying heat and pressure to the recording material so as to fix the toner image on the recording material, the fixing unit including a rotary member pair configured to form a first nip portion, a cooling unit disposed downstream of the fixing unit in a conveyance direction of the recording material, the cooling unit being configured to form a second nip portion cooling the recording material, on which the toner image has been fixed by the fixing unit, by nipping and conveying the recording material, a drive unit configured to drive the cooling unit, an obtaining unit configured to obtain information regarding torque of the drive unit, and a control unit configured to control the drive unit based on the information. In a state where the recording material is nipped by the first nip portion and the second nip portion, if the information is equal to or less than a threshold value, the control unit is configured to set a conveyance speed of the cooling unit at a first speed larger than a conveyance speed of the fixing unit. In the case where the recording material is nipped by the first nip portion and the second nip portion, if the information is larger than the threshold value, the control unit is configured to set the conveyance speed of the cooling unit at a second speed smaller than the conveyance speed of the fixing unit.

Further features of the present invention will become apparent from the following description of exemplary embodiments (with reference to the attached drawings).

DESCRIPTION OF THE EMBODIMENTS

First Embodiment

Image Forming System

Hereinafter, this embodiment will be described. First, a schematic configuration of an image forming apparatus of this embodiment will be described using FIGS. 1 and 2. An image forming system 1X illustrated in FIG. 1 includes an image forming apparatus 101, a large capacity sheet feed apparatus 106 including a plurality of recoding material storage units, and a sensing apparatus 107. The sensing apparatus 107 is disposed downstream of the image forming apparatus 101 with respect to a conveyance direction (from right to left in FIG. 1) of a recording material S by the large capacity sheet feed apparatus 106.

Figure 1:
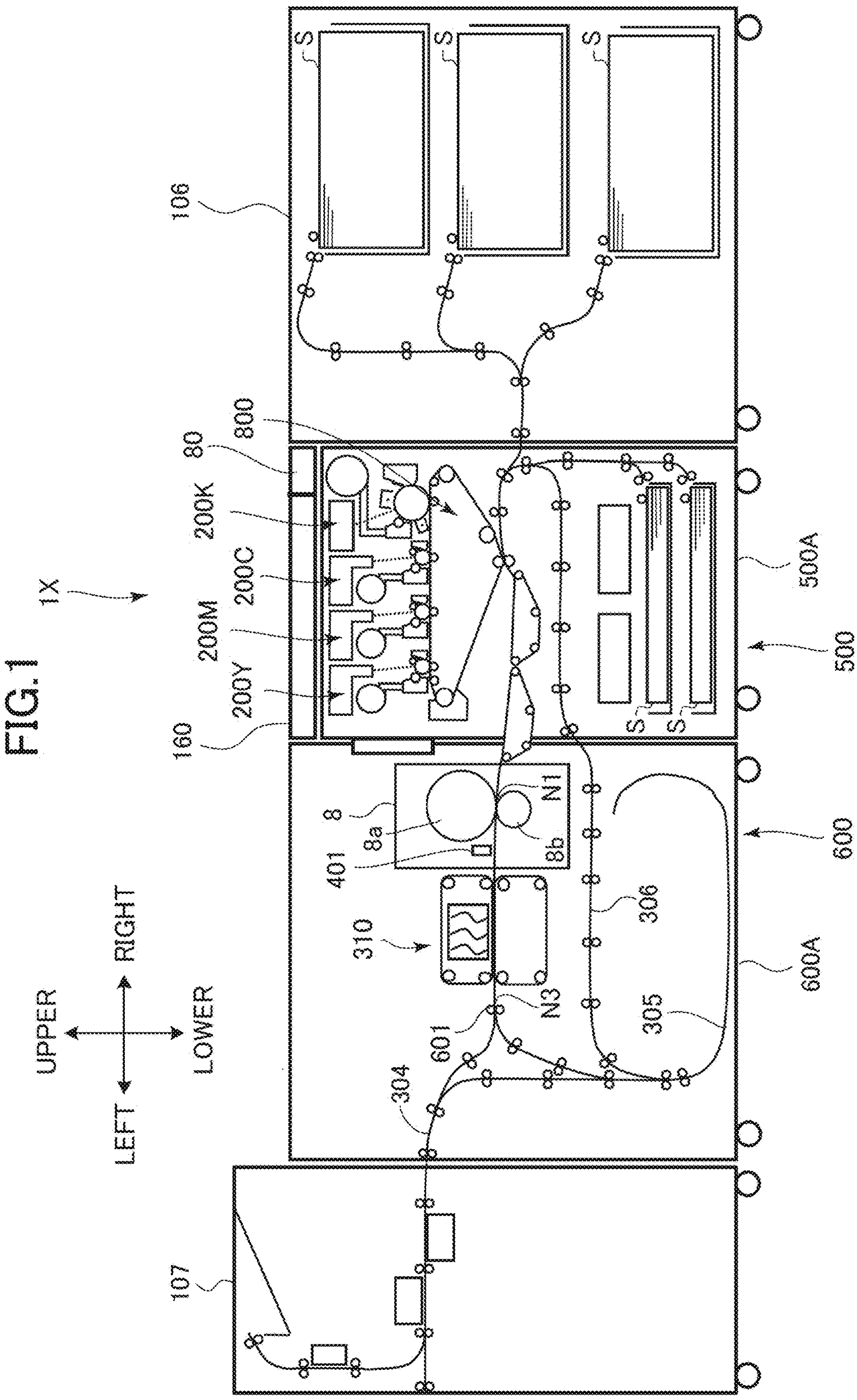
FIG. 1 is a schematic view illustrating an image forming system to which an image forming apparatus of this embodiment is applied.

To be noted, hereinafter, a side on which a user stands at the time of operating an operation unit 80, described below, is referred to as a front surface (or front), and the opposite side is referred to as a back surface (or back). Further, the left when viewed from the front surface is referred to as the left, and the right when viewed from the front surface is referred to as the right. Therefore, FIG. 1 illustrates a case where the image forming system 1X is viewed from the front surface.

With respect to the image forming apparatus 101, the large capacity sheet feed apparatus 106 and the sensing apparatus 107 are not only physically coupled so as to be capable of conveying the recording material S, but also electrically coupled so as to be capable of sending and receiving an electrical signal. The large capacity sheet feed apparatus 106 is an apparatus which supplies the recording material S to the image forming apparatus 101. The sensing apparatus 107 is an apparatus which reads toner images fixed on one or both sides of the recording material S discharged from the image forming apparatus 101 and feeds back an image signal to the image forming apparatus 101. The image forming apparatus 101 detects variance in an image density or an image position based on the fed back image signal, and corrects image data based on the detected variance in the image density or the image position. Then, based on the corrected image data, the image forming apparatus 101 forms the toner image on the recording material S by controlling image forming units 200Y to 200K.

To be noted, to an upstream side of the image forming apparatus 101 in the conveyance direction of the recording material, instead of the large capacity sheet feed apparatus 106, while not shown, it is possible to selectively connect a manual sheet feed apparatus, a long sheet feed apparatus capable of storing a long recording material, and the like. Alternatively, to the side further upstream than the large capacity sheet feed apparatus 106, while not shown, it is acceptable to selectively overlappingly connect the manual sheet feed apparatus, the long sheet feed apparatus, and the like. Further, to the side further downstream than the image forming apparatus 101 or the sensing apparatus 107, while not shown, it is possible to selectively connect one of or combined with a plurality of various post-processing apparatuses, such as an inserter, a puncher, a case bookbinding machine, a large capacity stacker, a folding machine, a finisher, and a trimmer. As described above, by selectively connecting the various optional apparatuses to the upstream and downstream sides of the image forming apparatus 101, it is possible to output in-line deliverables provided with the various post-processing processes with respect to the recording material S of various materials, and possible to provide the high productivity, high quality, highly stable, and high-performance image forming system 1X.

Image Forming Apparatus

The image forming apparatus 101 is roughly divided into an image forming transferring apparatus 500 and a fixing conveyance apparatus 600, which are bodies each configured separately. In a case of this embodiment, the image forming transferring apparatus 500, serving as an image forming unit, includes the image forming units 200Y, 200M. 200C, and 200K, an intermediate transfer belt unit 800, and the like for realizing processes up to a transfer process for transferring the toner image onto the recording material S. On the other hand, the fixing conveyance apparatus 600 includes a fixing unit 8 realizing a fixing process for fixing the toner image on the recording material S, a cooling unit 310, and the like. These image forming transferring apparatus 500 and the fixing conveyance apparatus 600 are connected to each other so as to be capable of sending and receiving the recording material S.

The image forming transferring apparatus 500 and the fixing conveyance apparatus 600 respectively include a casing 500A and a casing 600A which are independent from each other, and are movable by a plurality of casters disposed to each casing. Thereby, even in a case where the image forming transferring apparatus 500 and the fixing conveyance apparatus 600 are large apparatuses, it becomes possible to separately pack and transport the casings 500A and 600A, so that workability up to installation is improved. To be noted, a document reading apparatus 160 for reading the image information of a document, an operation unit 80 including a display unit capable of displaying various information, keys capable of inputting various information in response to a user operation, and the like are disposed on the casing 500A.

Each of the casings 500A and 600A includes a plurality of frames, such as a front-side plate on the front surface side, a back-side plate disposed on the back surface side and supporting the image forming units 200Y to 200K, the intermediate transfer belt unit 800, the fixing unit 8, the cooling unit 310, and the like with the front-side plate, and columns for connecting the front-side and back-side plates or supporting the front-side plate. Exterior covers made of resin are attached to the casings 500A and 600A described above. To be noted, it is acceptable to dispose the image forming transferring apparatus 500 and the fixing conveyance apparatus 600 not in separate casings (500A, 600A) but in a single casing.

Image Forming Transferring Apparatus

Figure 2A:
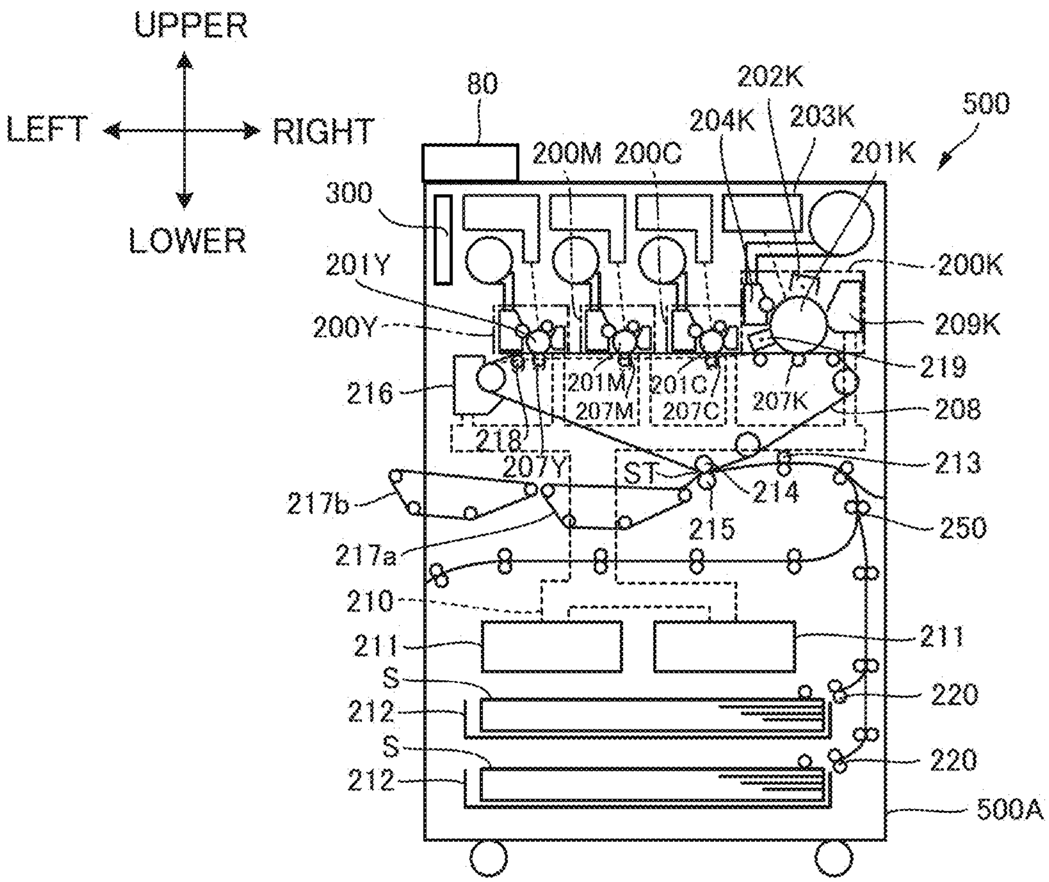
FIG. 2A is a cross-sectional view illustrating an image forming transferring apparatus.
Figure 2B:
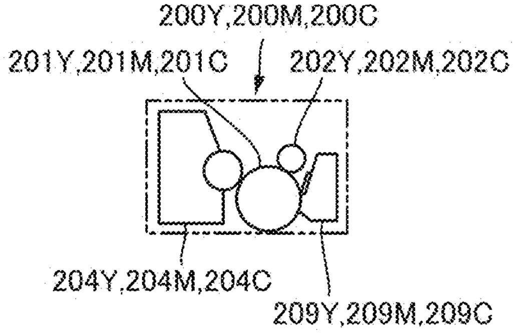
FIG. 2B is an enlarged view illustrating an image forming unit.

Next, using FIGS. 2A and 2B, the image forming transferring apparatus 500 will be described. The image forming transferring apparatus 500 is an apparatus of an intermediate transfer system in which the image forming units 200Y, 200M, 200C, and 200K housed in an interior of the casing 500A (inside of the casing) for forming the toner images of yellow, magenta, cyan, and black are disposed so as to face an intermediate transfer belt 208. The image forming transferring apparatus 500 forms the toner image on the recording material S in accordance with the image data sent from the document reading apparatus 160 disposed above the casing 500A (refer to FIG. 1) or an external apparatus, not shown, such as a personal computer. The recording material S includes sheet materials such as paper, a plastic film, and cloth.

A conveyance process of the recording material S in the image forming transferring apparatus 500 will be described. The recording material S is stored in a manner of being stacked inside of one or a plurality of cassettes 212 (two in this case), and is supplied by a supply roller 220 one sheet at a time in synchronization with the timing of image formation. The recording material S supplied by the supply roller 220 is conveyed to a registration roller 213 disposed in the middle of a conveyance path 250. Then, correction of the skew and timing of the recording material S is performed at the registration roller 213, and, thereafter, the recording material S is sent to a secondary transfer portion ST. The secondary transfer portion ST is formed by a secondary transfer inner roller 214 and a secondary transfer outer roller 215 facing each other across the intermediate transfer belt 208, and is a transfer nip portion at which the toner image is transferred from the intermediate transfer belt 208 onto the recording material S by the application of predetermined pressure and a secondary transfer voltage.

A forming process of an image which is sent to the secondary transfer portion ST in synchronization with the timing of the abovementioned conveyance process of the recording material S to the secondary transfer portion ST will be described. First, the image forming units 200Y to 200K will be described. However, since the image forming units 200Y to 200K for each color are basically the same except for a color of toner, hereinafter, the image forming unit 200K of black will be described as a representative.

The image forming unit 200K includes a photosensitive drum 201K, a charge unit 202K, a laser scanner 203K, a developing unit 204K, and the like. A surface of the rotating photosensitive drum 201K is uniformly charged beforehand by the charge unit 202K, and, thereafter, an electrostatic latent image is formed by the laser scanner 203K which is driven according to image data. Next, the developing unit 204K develops the electrostatic latent image formed on the photosensitive drum 201K by the toner contained in developer, and the toner image is formed on the photosensitive drum 201K.

Thereafter, predetermined pressure and a primary voltage are applied by a primary transfer roller 207K disposed so as to face the image forming unit 200K across the intermediate transfer belt 208, and the toner image formed on the photosensitive drum 201K is primarily transferred onto the intermediate transfer belt 208. A primary transfer residual toner remained on the photosensitive drum 201K after the primary transfer is collected by a drum cleaner 209K. The collected primary transfer residual toner is stored in a recovery toner container 211 via a toner recovery path 210.

The intermediate transfer belt 208 is an endless belt which is stretched by a plurality of stretch rollers and the secondary transfer inner roller 214 and is moved at a speed corresponding to a rotational speed of the photosensitive drums 201Y to 201K by a motor, not shown, or the like. The image forming processes of each color, which are processed in parallel by the image forming units 200Y to 200K for each color described above, are performed in the timing sequentially superimposing the toner image on an upstream color toner image which has been primarily transferred onto the intermediate transfer belt 208 on an upstream side in a moving direction of the intermediate transfer belt 208. As a result, finally, a full color toner image is formed on the intermediate transfer belt 208, and conveyed to the secondary transfer portion ST. A secondary transfer residual toner remained on the intermediate transfer belt 208 after having passed through the secondary transfer portion ST is collected from the intermediate transfer belt 208 by a belt cleaner apparatus 216. To be noted, it is acceptable to dispose the primary transfer rollers 207Y to 207K, the intermediate transfer belt 208, the plurality of stretch rollers, the second transfer inner roller 214, and the belt cleaner apparatus 216 integrally with each other as the intermediate transfer belt unit 800.

By the conveyance process and the image forming process described above, the timing of the recording material S and the toner image matches at the secondary transfer portion ST, and a secondary transfer for transferring the toner image from the intermediate transfer belt 208 onto the recording material S is performed. Thereafter, the recording material S is conveyed to the fixing conveyance apparatus 600 by pre-fixing belts 217*a* and 217*b*, and the fixing conveyance apparatus 600 fixes the toner image on the recording material S.

Fixing Conveyance Apparatus

Next, the fixing conveyance apparatus 600 will be described. As illustrated in FIG. 1, the fixing conveyance apparatus 600 includes the fixing unit 8 and the cooling unit 310. The fixing unit 8, serving as a fixing unit, includes a fixing roller 8*a* heated by a heater, not shown, and a press roller 8*b* pressing the recording material S to the fixing roller 8*a*. The fixing roller 8*a* is rotatably driven by a fixing drive motor 700 (refer to FIG. 4) described below. The recording material S, which is conveyed from the image forming transferring apparatus 500 and on which the toner image has been formed, is heated and pressed while being nipped and conveyed by a fixing nip portion N1 formed by the fixing roller 8*a* and the press roller 8*b*. Thereby, the toner image is fixed on the recording material S. Then, in this embodiment, a fixing exit sensor 401 capable of detecting individually the passage of a leading edge and trailing edge of the recording material S through the fixing nip portion N1 is disposed at an exit of the fixing nip portion N1 (on a downstream side in the conveyance direction of the recording material S).

To be noted, while, herein, the fixing unit 8 including a roller pair of the fixing roller 8*a* and the press roller 8*b* is shown as an example, it is not limited to this. For example, it is acceptable that the fixing unit includes a fixing belt instead of the fixing roller 8*a* and heats and presses the recording material S while nipping and conveying the recording material S by a fixing nip formed by the fixing belt and the press roller 8*b* so as to fix the toner image on the recording material S.

The recording material S which has been heated by the fixing unit 8 is conveyed toward the cooling unit 310, and cooled by the cooling unit 310. The cooling unit 310 is disposed so as to be capable of nipping the recording material S in a state where the recording material S is nipped by the fixing unit 8 (in particular, the fixing nip portion N1). The cooling unit 310 will be described below (refer to FIG. 3).

The recording material S which has been cooled by the cooling unit 310 is conveyed by being nipped by an after-conveyance roller unit 601 disposed at an exit of a cooling nip portion N2 (on the downstream side in the conveyance direction of the recording material S). The after-conveyance roller unit 601, serving as an after-conveyance unit, includes a pair of rollers which form a conveyance nip portion N3 for nipping and conveying the recording material S, and is rotatably driven by an after-conveyance drive motor 701

Figure 4:
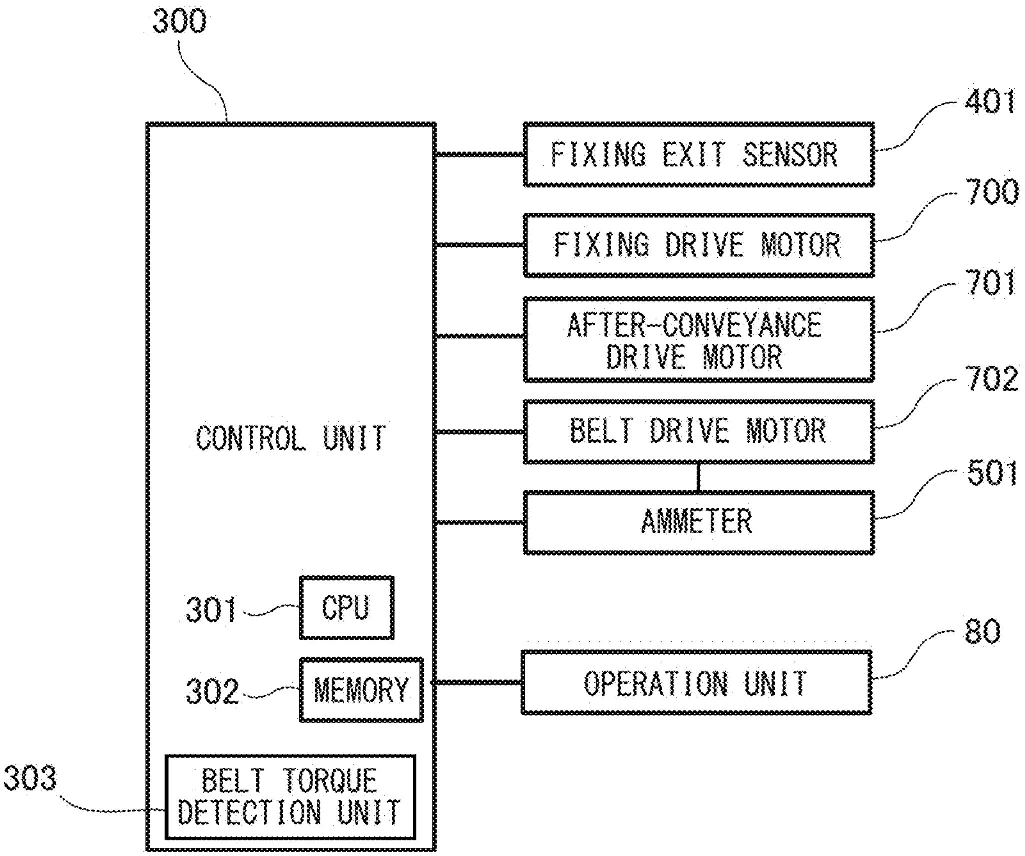
FIG. 4 is a control block diagram illustrating a control unit.

(refer to FIG. 4). The after-conveyance roller unit 601 is disposed so as to be capable of nipping the recording material S in a state where the recording material S is nipped by the cooling unit 310 (in particular, the cooling nip portion N2).

In a case of a simplex printing mode in which the toner image is formed only on one side of the recording material S, the recording material S which has been cooled is guided from the after-conveyance roller unit 601 to a sheet discharge conveyance path 304, and discharged from the casing 600A toward the sensing apparatus 107. On the other hand, in a case of a duplex printing mode in which the toner images are formed on both sides of the recording material S, the recording material S which has been cooled is guided from the after-conveyance roller unit 601 to an inverse conveyance path 305, and, after the front and back surfaces of the recording material have been inverted in the inverse conveyance path 305, returned to the image forming transferring apparatus 500 via a duplex conveyance path 306. Thereafter, through a process similar to a case of the simplex printing mode, the toner image is fixed also on the other surface of the recording material S by the fixing unit 8. Then, after having been cooled by the cooling unit 310, the recording material S is guided to the sheet discharge path 304, and discharged from the casing 600A toward the sensing apparatus 107.

Cooling Unit

Figure 3:
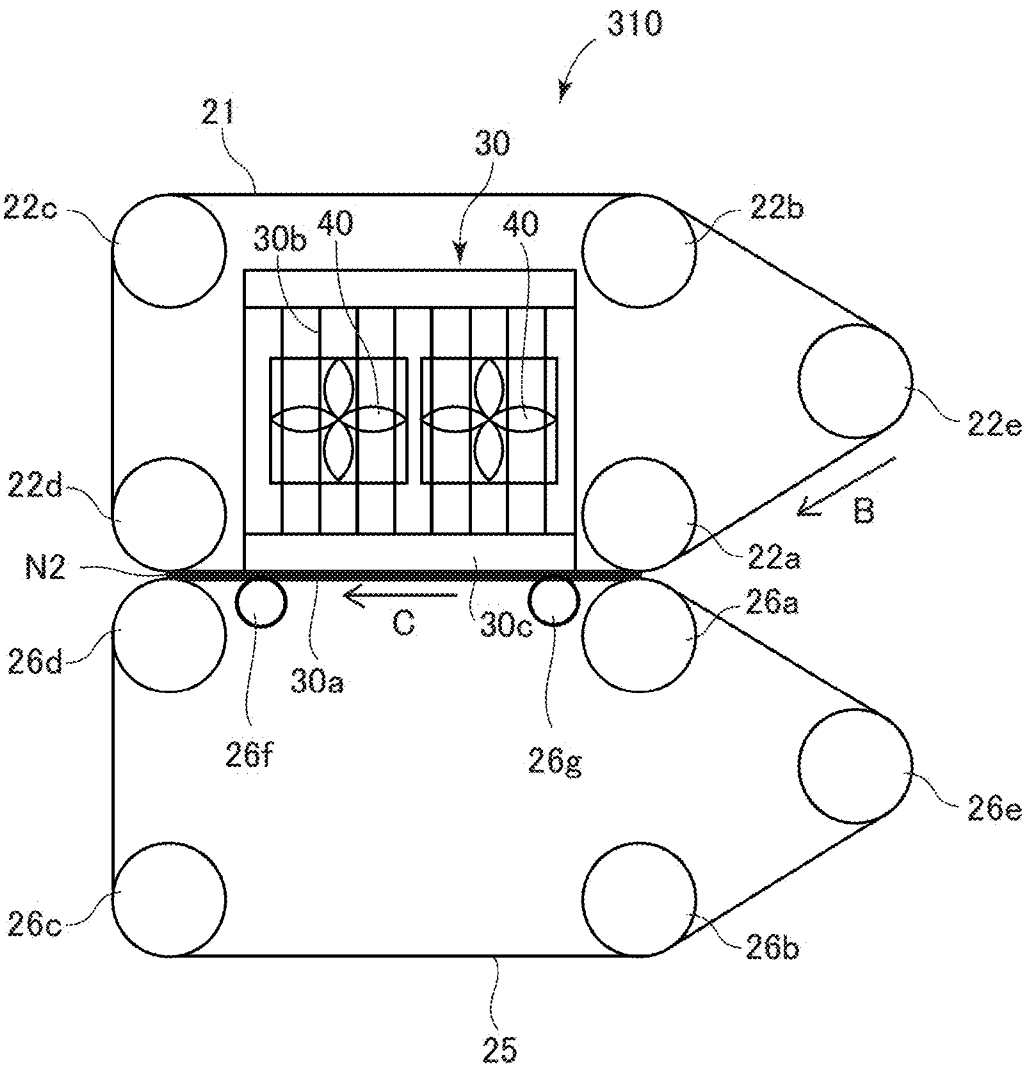
FIG. 3 is a schematic view illustrating a cooling unit.

Next, the cooling unit 310 will be described using FIG. 3. As illustrated in FIG. 3, the cooling unit 310, serving as a cooling unit, includes an endless first belt 21, and an endless second belt 25 forming the cooling nip portion N2 with the first belt 21 for nipping and conveying the recording material S. The first and second belts 21 and 25 are, for example, formed of polyimide having high strength, and the thickness and circumferential lengths of the first and second belts 21 and 25 are respectively set at 100 micrometers (μm) and 942 millimeters (mm). The cooling unit 310 includes a heat sink 30 for cooling the first belt 21.

The first belt 21 is wound over a drive roller **22*a* and a plurality of belt stretch rollers 22*b* to 22*e*, and the second belt 25 is wound over a drive roller 26*a* and a plurality of belt stretch rollers 26*b* to 26*e*. These drive rollers 22*a* and 26*a* are coupled to a single belt drive motor 702 (refer to FIG. 4) via a drive gear, not shown, and rotatably driven by the belt drive motor 702. In this embodiment, the belt drive motor 702**, serving as a drive unit, uses a direct-current motor which has a wide speed response zone.

Press rollers **26*f* and 26*g* pressing the second belt 25 toward the heat sink 30 are disposed on an inner circumferential side of the second belt 25. The press rollers 26*f* and 26*g* press the second belt 25 by the pressing force of, for example, 9.8 newtons (N) (1 kilogram-force (kgf)), so that the first belt 21 is surely brought into contact with the heat sink 30 via the second belt 25**.

The recording material S on which the toner image has been fixed is nipped between the first and second belts 21 and 25, and conveyed in the conveyance direction (arrow C direction in FIG. 3) following circulating movements of these belts. At that time, the recording material S passes through the cooling nip portion N2 which is formed by bringing the first and second belts 21 and 25 into contact with each other. In the case of this embodiment, the first belt 21 is cooled by the heat sink 30. So as to cool the recording material S efficiently, the heat sink 30 is disposed so as to come into contact with an inner surface of the first belt 21 in a portion where the cooling nip portion N2 is formed. The recording material S is cooled via the first belt 21 when passing through the cooling nip portion N2, so that, even if the toner on the recording material S was in a molten state before the recording material S has come into contact with the first belt 21, the toner is cooled and fixed on the recording material S. For example, a temperature of the recording material S is increased to 90° C. by the fixing unit 8, and decreased to 60° C. by the cooling unit 310. At this time, a temperature of the toner image which has been fixed on the recording material S is also decreased from the 90° C. to 60° C.

The heat sink 30 is a heat dissipating plate formed by metal, for example, such as aluminum. The heat sink 30 includes a heat receiving portion **30*a* for coming into contact with the first belt 21 so as to remove heat, a heat dissipating portion 30*b* for dissipating the heat, and a fin base 30*c* for conducting the heat from the heat receiving portion 30*a* to the heat dissipating portion 30*b*. The heat dissipating portion 30*b* is formed by a number of heat dissipating fins so as to facilitate efficient heat dissipation by gaining a contact area with air. To be noted, cooling fans 40 blowing the air toward the heat sink 30 are disposed so as to forcibly cool the heat sink 30** itself.

Control Unit

As illustrated in FIG. 2, the image forming transferring apparatus 500 includes a control unit 300. The control unit 300, serving as a control unit, performs the various control of the image forming apparatus 101. With reference to FIGS. 1 to 3, the control unit 300 will be described using FIG. 4. However, while various equipment such as motors and power sources for operating the image forming apparatus 101 is connected to the control unit 300 besides equipment illustrated in FIG. 4, since such equipment is outside of the main purpose of this disclosure, an illustration and description of such equipment will be omitted herein.

As illustrated in FIG. 4, the control unit 300 includes a central processing unit (CPU) 301 and a memory 302 such as a read only memory (ROM) and a random access memory (RAM). The memory 302 stores various programs for such as, for example, an image forming job and a speed control process (refer to FIG. 5 described below), various data, and the like. The control unit 300 can execute the various programs stored in the memory 302, and can operate the image forming apparatus by executing the various programs. To be noted, the memory 302 can also temporarily store a result of a calculation process and the like accompanying the execution of the various programs.

The image forming job means the sequence of operations from the beginning of an image forming operation based on a printing signal for forming the image on the recording material S to the completion of the image forming operation. That is, the image forming job means the sequence of operations from the start of a preparatory operation (so-called pre-rotation) necessary for performing the image formation to the completion of a preparatory operation (so-called after-rotation) necessary for completing the image formation through image forming steps. In particular, the image forming job means the sequence of operations from the time of the pre-rotation after having received the printing signal (receipt of the image forming job) to the after-rotation (operation after the image formation), and includes periods for the image formation and a sheet gap.

The operation unit 80, the fixing exit sensor 401, the fixing drive motor 700, the after-conveyance drive motor 701, the belt drive motor 702, and an ammeter 501 are coupled to the control unit 300 via an input/output interface. The operation unit 80 is, for example, an operation panel, an external terminal, or the like, which receives execution instructions of the various programs by the user and the input of various data such as information regarding the recording material S (for example, size information such as A3 and B4).

Based on a detection result of the fixing exit sensor 401, the control unit 300 can detect, with respect to the conveyance direction of the recording material S in the fixing unit 8, the passage of the leading edge of the recording material S through the fixing nip portion N1 and the passage of the trailing edge of the recording material S through the fixing nip portion N1. Further, in accordance with an elapsed time from the detection of the passage of the trailing edge of the recording material S through the fixing nip portion N1, the control unit 300 can judge whether or not the trailing edge of the recording material S has passed through the cooling nip portion N2.

The control unit 300 controls the fixing drive motor 700 so as to control the drive start and stop of the fixing roller 8*a* and the fixing conveyance speed. Further, the control unit 300 controls the after-conveyance drive motor 701 so as to control the drive start and stop of the after-conveyance roller unit 601 and the after-conveyance speed. Further, the control unit 300 controls the belt drive motor 702 so as to control the drive start and stop of the first belt 21 and the cooling conveyance speed. In the case of this embodiment, when starting the image forming job, the control unit 300 sets the cooling conveyance speed of the first belt 21 and the after-conveyance speed of the after-conveyance roller unit 601 at a speed (hereinafter referred to as a first nominal speed) 1.5% faster than the fixing conveyance speed of the fixing roller 8*a*. Thereby, if the recording material S is conveyed in a state where the recording material S is nipped at the fixing and cooling nip portions N1 and N2, a loop becomes less likely to be generated in the recording material S between the fixing unit 8 and the cooling unit 310.

The ammeter 501 for detecting an electrical current flowing in the belt drive motor 702 is coupled to the belt drive motor 702. The control unit 300 includes a belt torque detection unit 303, serving as an obtaining unit to obtain information regarding the torque of the belt drive motor 702, and the belt torque detection unit 303 is configured to receive the electrical current value of the ammeter 501 as the information regarding the torque of the belt drive motor 702. In the present embodiment, the belt torque detection unit 303 can detect the drive torque (hereinafter referred to as cooling drive torque) of the belt drive motor 702 based on the electrical current value of the ammeter 501. The control unit 300 controls the belt drive motor 702 based on the information regarding the torque so as to control the cooling conveyance speed for conveying the recording material S by the cooling unit 310.

Incidentally, during the execution of the image forming job, depending on the length of the recording material S in the conveyance direction, in some cases, the recording material S is conveyed while being nipped at the cooling nip portion N2 in a state where the recording material S is also nipped at the fixing nip portion N1. In such a case, if, as described above, the cooling conveyance speed (first nominal speed) is faster than the fixing conveyance speed, since the recording material S is conveyed while being pulled by the first second belt 21 from the fixing unit 8, as described above, the cooling drive torque is increased.

When the trailing edge of the recording material S has passed through the fixing nip portion N1 while the cooling drive torques is being kept in an increased state, the tension of the recording material S is eliminated. Since the first belt 21 temporarily rotate fast at that time, the cooling conveyance speed becomes faster than the first nominal speed, and, thereafter, returns to the first nominal speed. If the cooling conveyance speed temporarily becomes faster than the first nominal speed as described above, there is the fear that the loop will be generated in the recording material S between the first belt 21 and the after-conveyance roller unit 601 and a trace of the loop or image scratch will be generated in the recording material S due to the loop. So as to prevent this, at the time when the trailing edge of the recording material S has passed through the fixing nip portion N1, in other words, before the tension of the recording material has been eliminated, it is necessary to suppress an increase in the cooling drive torque so that the cooling drive torque will not be increased to such an extent that the cooling conveyance speed temporarily becomes faster than the first nominal speed.

Speed Control Process

Figure 5:
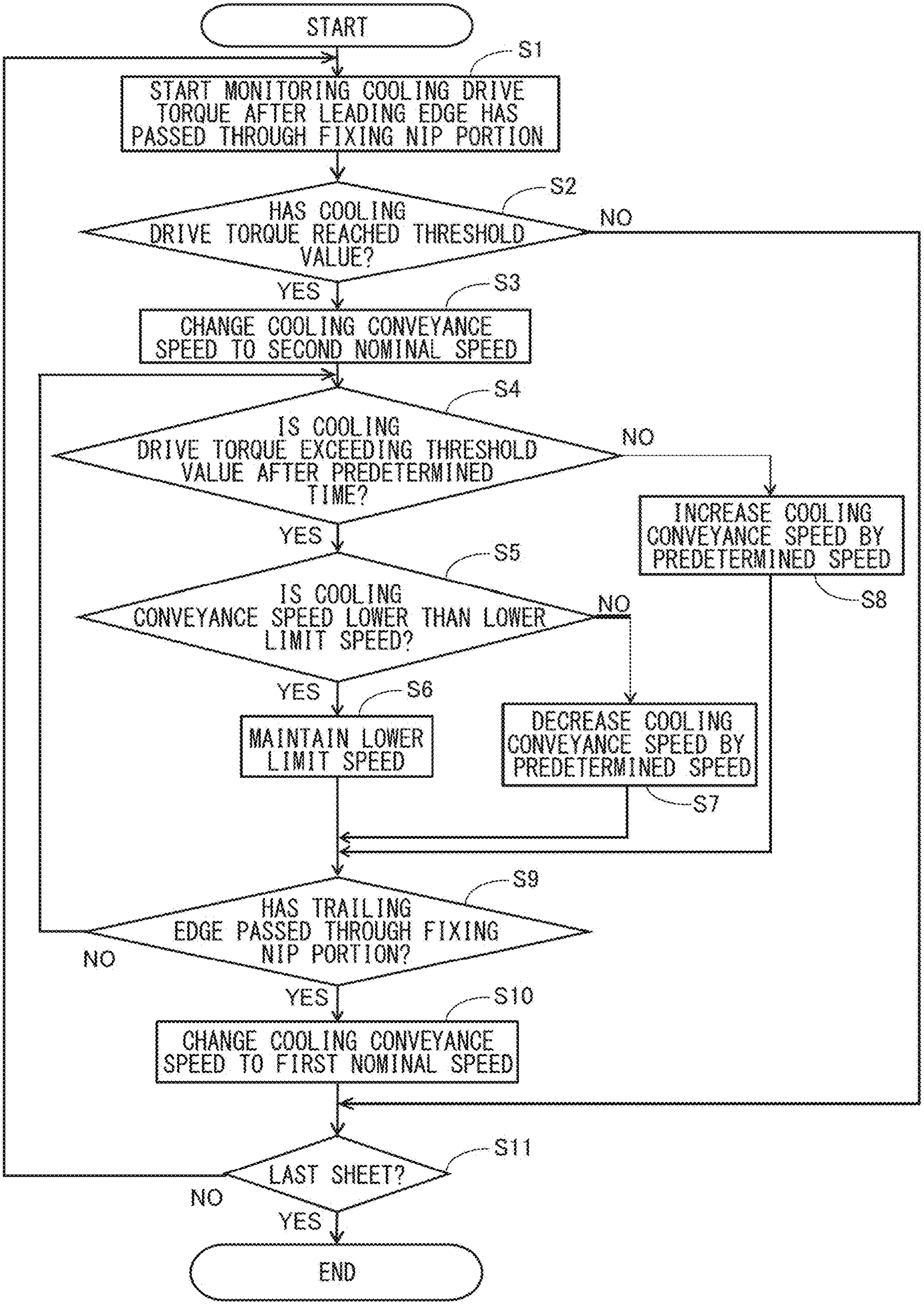
FIG. 5 is a flowchart illustrating a speed control process of a first embodiment.
Figure 6:
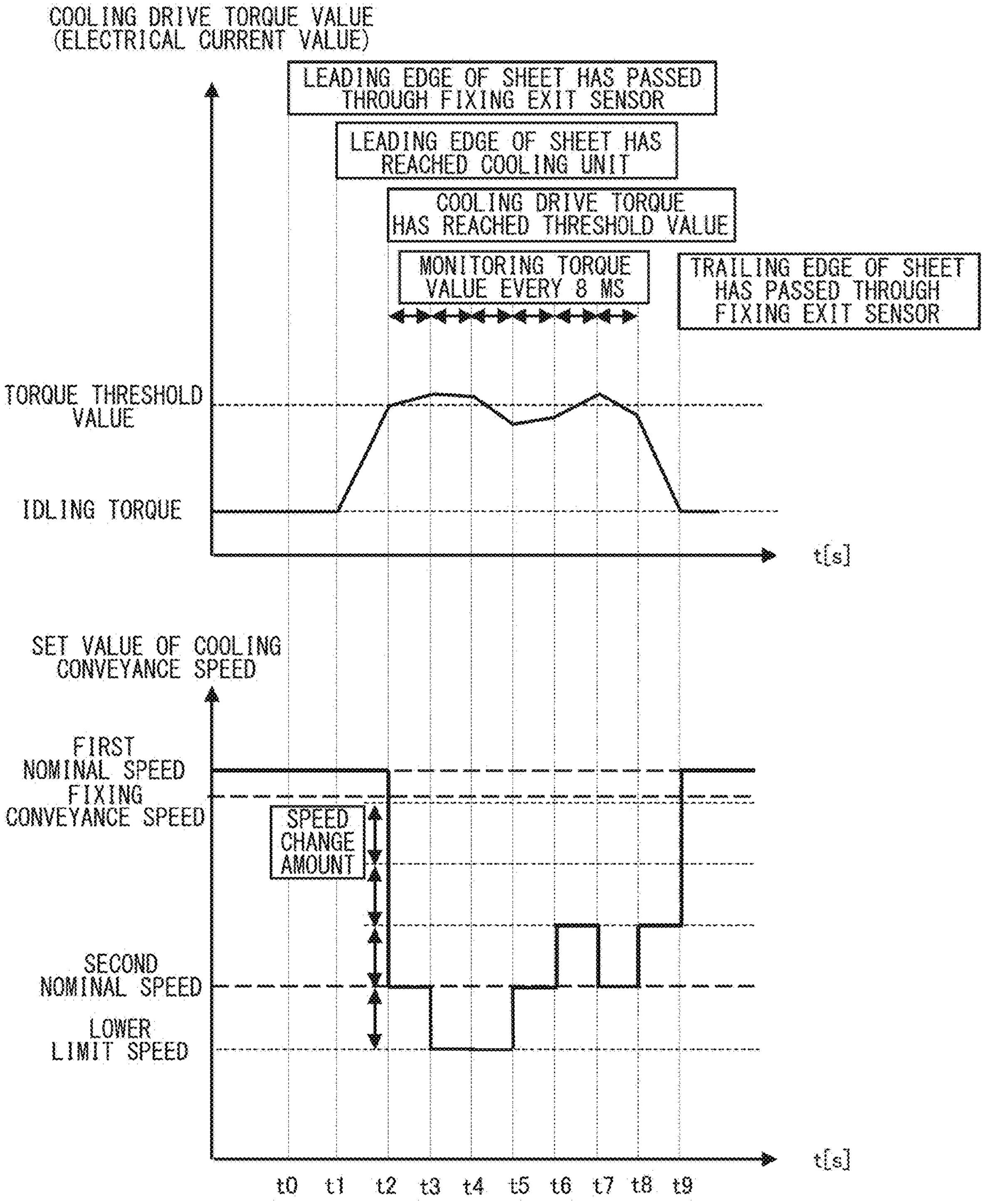
FIG. 6 are graphs illustrating cooling drive torque and a time change of a cooling conveyance speed in the first embodiment.

Therefore, in view of the above, in this embodiment, the cooling drive torque is detected, and the cooling conveyance speed is adjusted based on the detected cooling drive torque. Hereinafter, with reference to FIGS. 1, 3, and 4, a speed control process for realizing such an adjustment will be described using FIGS. 5 and 6. FIG. 5 is a flowchart illustrating the speed control process of the first embodiment. In FIG. 6, an upper part is a graph illustrating a time change of the cooling drive torque with respect to a sheet of the recording material S, and a lower part is a graph illustrating a time change of the cooling conveyance speed with respect to a sheet of the recording material S. The speed control process of this embodiment is executed by the control unit 300 in conjunction with, for example, the start of the image forming job.

In a case where, during the execution of the image forming job, based on the detection result of the fixing exit sensor 401, the control unit 300 judges that the leading edge of the recording material S has passed through the fixing nip portion N1 (time t0), the control unit 300 starts the detection of the cooling drive torque (STEP S1). As described above, the control unit 300 detects the cooling drive torque based on the electrical current value of the ammeter 501. When the cooling unit 310 is idling (up to time t1), the cooling conveyance speed, alongside the after-conveyance speed, is set at the first nominal speed (for example, 450 millimeters/second (mm/s) which is 1.5% faster than the fixing conveyance speed (for example, 443 mm/s). Then, when the leading edge of the recording material S has reached the cooling nip portion N2 (time t1), the conveyance of the recording material S in a state where the recording material S is nipped by the fixing and cooling nip portions N1 and N2 while being pulled by the first belt 21 from the fixing unit 8 is started, and, thereafter, the cooling drive torque is increased. At the time of the idling, the cooling drive torque is, for example, 200 milliamperes (mA). To be noted, herein, the torque value is expressed by the electrical current value of the belt drive motor 702.

The control unit 300 judges whether or not the cooling drive torque, which is increased due to a setting at the first nominal speed, reaches a torque threshold value (STEP S2). The torque threshold value is a lower limit value of the torque at which the cooling conveyance speed becomes temporarily faster than the after-conveyance speed when the trailing edge of the recording material S, which was in the state of being pulled between the fixing unit 8 and the cooling unit 310, has passed through the fixing nip portion N1, and, for example, 500 mA. That is, if the trailing edge of the recording material S has passed through the fixing nip portion N1 in a state where the cooling drive torque is exceeding the torque threshold value, the loop is likely to be generated in the recording material S between the cooling unit 310 and the after-conveyance roller unit 601.

In a case where the cooling drive torque has not reached the torque threshold value (STEP S2: NO), the control unit 300 jumps to a process of STEP S11. On the other hand, in a case where the cooling drive torque has reached the torque threshold value (STEP S2: YES), the control unit 300 controls the belt drive motor 702 so as to change the cooling conveyance speed to a second nominal speed (STEP S3). The second nominal speed is a speed (for example, 430 mm/s) which is slower than the fixing conveyance speed. In this case, the tension of the recording material S by the first belt 21 whose speeds have been changed to the second nominal speed is weakened, and the cooling drive torque is lessened. Therefore, when the trailing edge of the recording material S has passed through the fixing nip portion N1, the loop becomes less likely to be generated in the recording material S between the cooling unit 310 and the after-conveyance roller unit 601.

Incidentally, since, if the second nominal speed is maintained as it is, there is the fear that the loop will be generated between the fixing unit 8 and the cooling unit 310, it is necessary to increase the cooling conveyance speed again. Therefore, so as not to generate the loop in the recording material S between the fixing unit 8 and the cooling unit 310 and not to increase the cooling drive torque, it is necessary to bring the recording material S into a state of being properly pulled between the fixing unit 8 and the cooling unit 310.

After having changed the cooling conveyance speed to the second nominal speed, the control unit 300 monitors at predetermined time intervals (for example, 8 milliseconds (ms)) whether or not the cooling drive torque is exceeding the abovementioned torque threshold value (STEP S4). In a case where the cooling drive torque, which changes accompanying the change in the cooling conveyance speed, exceeds the torque threshold value (STEP S4: YES), unless the cooling conveyance speed becomes smaller than a predetermined lower limit speed (STEP S5: NO), the control unit 300 controls the belt drive motor 702 so as to decrease the cooling conveyance speed by a predetermined speed (STEP S7). In a case where the cooling conveyance speed is smaller than the predetermined lower limit speed (STEP S5: YES), the control unit 300 sets the cooling conveyance speed at the lower limit speed (STEP S6). The predetermined speed is, for example, 4 mm/s, and the lower limit speed is, for example, 426 mm/s which is a speed 4 mm/s slower than the second nominal speed.

In an example illustrated in FIG. 6, after having changed the cooling conveyance speed to the second nominal speed (time t2), the cooling drive torque exceeds the torque threshold value at the time t3 and t4 of every 8 ms. Therefore, the cooling conveyance speed is decreased from the second nominal speed by the predetermined speed at the time t3. Further, since, if the cooling conveyance speed is decreased from the second nominal speed by the predetermined speed at the time t4, the cooling conveyance speed becomes smaller than the lower limit speed, the cooling conveyance speed is decreased within a limit of the lower limit speed. Since, when the cooling conveyance speed is decreased as described above, the tension of the recording material S by the first belt 21 is weakened, the cooling drive torque is lessened in conjunction with a decrease in cooling conveyance speed (time t3 to t5).

On the other hand, in a case where the cooling drive torque is equal to or less than the torque threshold value (STEP S4: NO), the control unit controls the belt drive motor 702 so as to increase the cooling conveyance speed by a predetermined speed (STEP S8). It is acceptable that the predetermined speed for increasing the speed is the same as the predetermined speed (4 mm/s) for decreasing the speed. When the cooling drive torque is lessened (time t3 to t5), the cooling drive torque becomes equal to or less than the torque threshold value (time t5). Then, the cooling conveyance speed is increased at the time t5. Since, when the cooling conveyance speed is increased as described above, the tension of the recording material S by the first belt 21 is strengthened, the cooling drive torque is increased in conjunction with the increase in the cooling conveyance speed (after time t5). Thereby, the loop becomes less likely to be generated in the recording material S between the fixing unit 6 and the cooling unit 310.

Based on the detection result of the fixing exit sensor 401, the control unit 300 judges whether or not the trailing edge of the recording material S has passed through the fixing nip portion N1 (STEP S9). In a case where the trailing edge of the recording material S has not passed through the fixing nip portion N1 (STEP S9: NO), the control unit 300 returns to STEP S4, and repeats the processes of STEPS S4 to S8 described above. Thereby, by repeating the increase and decrease of the cooling conveyance speed described above until the trailing edge of the recording material S has passed through the fixing nip portion N1, the cooling drive torque is maintained within the torque which is less likely to generate the loop in the recording material S (time t2 to t8).

In a case where the trailing edge of the recording material S has passed through the fixing nip portion N1 (STEP S9: YES), the control unit 300 returns the cooling conveyance speed to the first nominal speed (STEP S10). Since, by returning the cooling conveyance speed to the first nominal speed (time t9), the recording material S which is conveyed next is conveyed while being pulled by the first belt 21 from the fixing unit 8, it is possible to make it less likely to generate the loop in the recording material S between the fixing unit 8 and the cooling unit 310.

Then, the control unit 300 judges whether or not the image formation on the last recording material S in the executing image forming job has been ended (STEP S11). In a case where the image formation on the last recording material S has not been ended (STEP S11: NO), the control unit 300 returns to the process of STEP S1, and repeats the processes of STEP S1 to S10. On the other hand, in a case where the image formation on the last recording material S has been ended (STEP S11: YES), the control unit 300 ends this speed control process.

As described above, in this embodiment, in the case where the cooling drive torque has reached the torque threshold value in the state where the recording material S is nipped at the fixing and cooling nip portions N1 and N2, the cooling conveyance speed is changed to the second nominal speed which is slower than the fixing conveyance speed. Thereby, when the trailing edge of the recording material S has passed through the fixing nip portion N1, the loop becomes less likely to be generated in the recording material S between the cooling unit 310 and the after-conveyance roller unit 601.

Then, in the state where the recording material S is nipped by the fixing unit 8 and the cooling unit 310, the cooling conveyance speed is increased and decreased so that the cooling drive torque, which changes in conjunction with the change in the cooling conveyance speed, will not exceed the torque threshold value. If the cooling drive torque does not exceed the torque threshold value, when the trailing edge of the recording material S has passed through the fixing nip portion N1, the cooling conveyance speed does not temporarily become faster than the after-conveyance speed. Therefore, since, when the trailing edge of the recording material S has passed through the fixing nip portion N1, the loop is not generated in the recording material S between the cooling unit 310 and the after-conveyance roller portion 601, image defects due to the loop do not occur. Further, since, even in the state where the recording material S is nipped by the fixing unit 8 and the cooling unit 310, the cooling conveyance speed is increased and decreased based on a torque change in the cooling drive torque, the loop is not generated in the recording material S between the fixing unit 8 and the cooling unit 310.

To be noted, while, in the case of this embodiment, based on the detection result of the fixing exit sensor 401, the control unit is enabled to judge whether the leading edge or the trailing edge of the recording material S has passed through the fixing nip portion N1, it is not limited to this. For example, by disposing a fixing inlet sensor on an upstream side of the fixing nip portion N1, it is acceptable to enable the control unit 300 to judge the passage of the leading edge or the trailing edge of the recording material S through the fixing nip portion N1 based on the timing of the passage of the leading edge or the trailing edge of the recording material S through the fixing inlet sensor and the fixing conveyance speed. Further, while the control unit 300 is enabled to detect the cooling drive torque based on the electrical current value flowing in the belt drive motor 702 detected by the ammeter 501, it is not limited to this, and acceptable to detect the torque value of the belt drive motor 702 by using a torque sensor and the like.

Second Embodiment

Incidentally, if the length of the recording material S in the conveyance direction is longer than a distance from the fixing unit 8 to the after-conveyance roller unit 601, the leading edge of the recording material S reaches the after-conveyance roller unit 601 while the recording material S is being nipped by the fixing unit 8. That is, the recording material S is brought into a state of being nipped at the fixing and cooling nip portions N1 and N2. The nipping force of the after-conveyance roller unit 601 is set to be weaker than the nipping force of the fixing unit 8, and set to be stronger than the nipping force of the cooling unit 310. In this case, if, as described above, similarly to the cooling conveyance speed, the after-conveyance speed is 1.5% faster than the fixing conveyance speed, the after-conveyance roller unit 601 becomes likely to slip with respect to the recording material S which is being nipped by the after-conveyance roller unit 601, so that the drive torque of the after-conveyance roller unit 601 is increased.

So as to prevent this, in a case where the length of the recording material S in the conveyance direction is, for example, 30 inches and is longer than the distance from the fixing unit 8 to the after-conveyance roller unit 601, the after-conveyance speed is preferably approximately the same as the fixing conveyance speed. Therefore, in a case where the length of the recording material S in the conveyance direction is shorter than the distance from the fixing unit 8 to the after-conveyance roller unit 601, as described above, when starting the image forming job, the control unit 300 sets both of the cooling conveyance speed and the after-conveyance speed at the first nominal speed (for example, 450 mm/s) which is faster than the fixing conveyance speed.

On the other hand, in the case where the length of the recording material S in the conveyance direction is longer than the distance from the fixing unit 8 to the after-conveyance roller unit 601, when starting the image forming job, the control unit 300 respectively sets the cooling conveyance speed and the after-conveyance speed at the first nominal speed and the fixing conveyance speed. However, as described above, if the cooling conveyance speed is changed to the first nominal speed at the timing in which the trailing edge of the recording material S has passed through the fixing nip portion N1 (refer to STEP S10 in FIG. 5), the cooling conveyance speed becomes faster than the after-conveyance speed, so that such a change in the cooling conveyance speed is not preferred since the loop is generated in the recording material S between the cooling unit 310 and the after-conveyance roller unit 601.

Therefore, hereinafter, with reference to FIGS. 1, 3, and 4, a speed control process which takes into consideration the control of the cooling conveyance speed in the case where the length of the recording material S in the conveyance direction is longer than the distance from the fixing unit 8 to the after-conveyance roller unit 601 will be described using FIGS. 7 and 8. However, since, in the speed control process illustrated in FIG. 7, processes of STEPS S1 to S11 are the same as the speed control process of the first embodiment (refer to FIG. 5), descriptions of the processes of STEPS S1 to S11 will be omitted herein.

Figure 7:
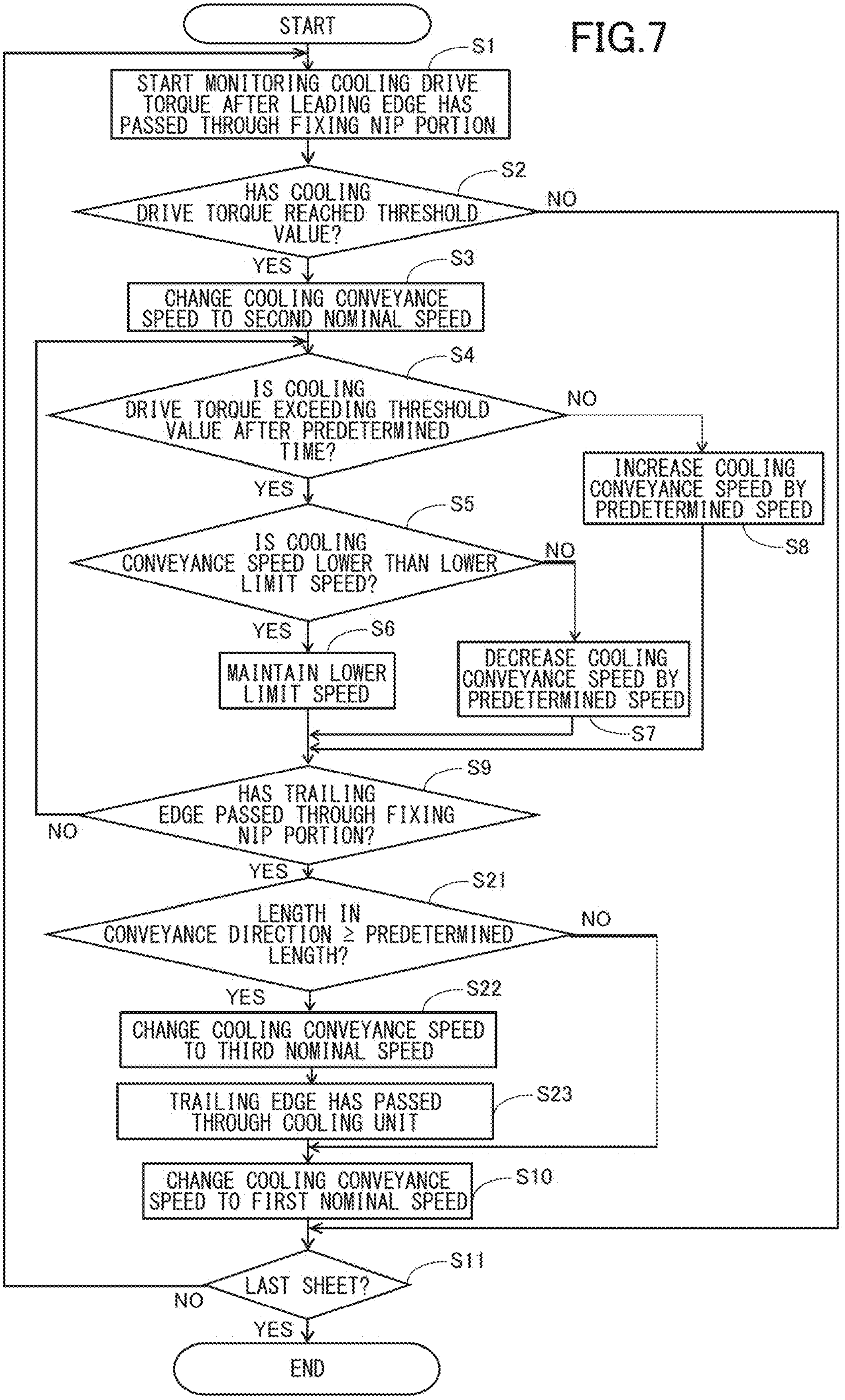
FIG. 7 is a flowchart illustrating a speed control process of a second embodiment.
Figure 8:
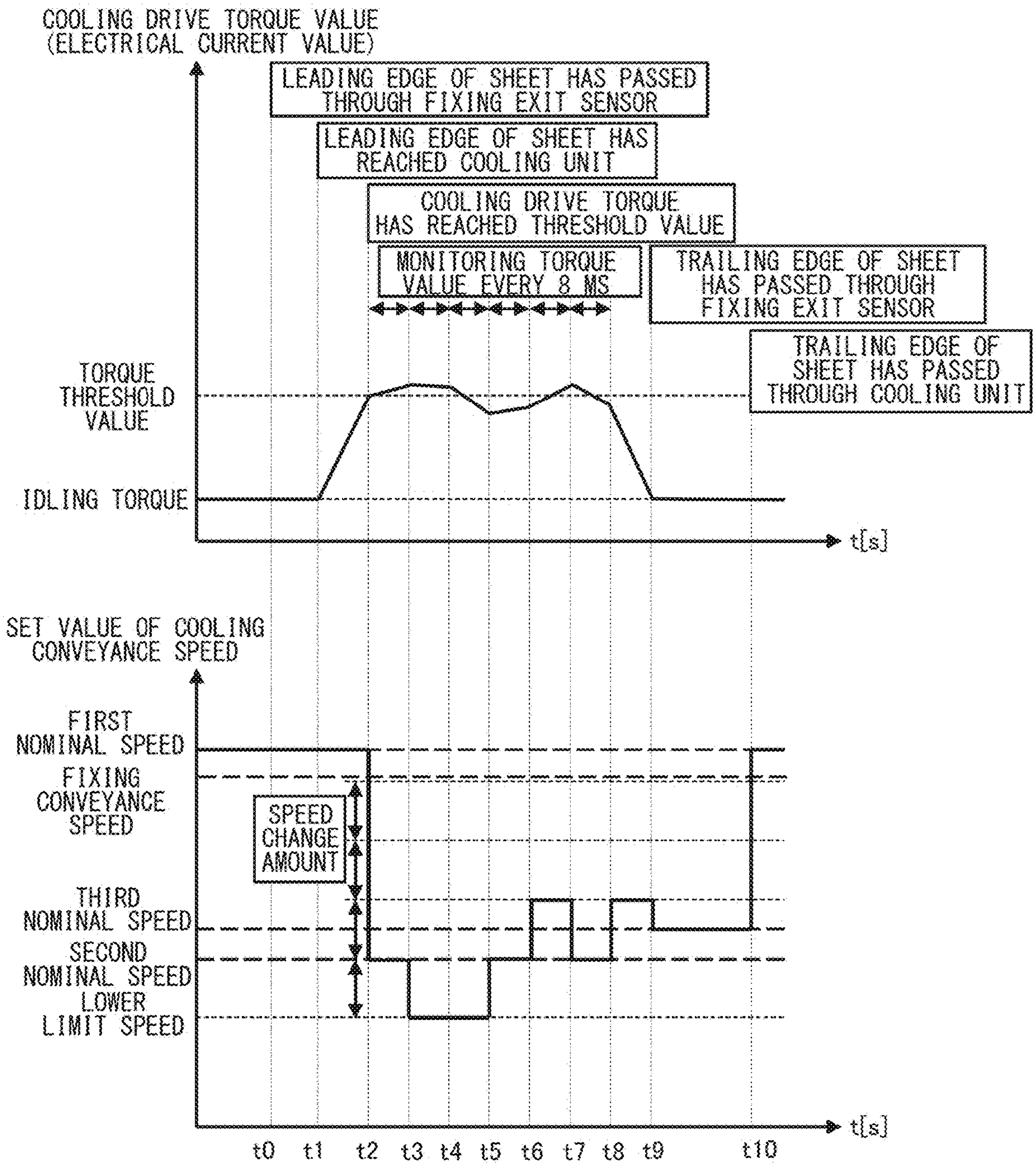
FIG. 8 are graphs illustrating cooling drive torque and a time change of a cooling conveyance speed in the second embodiment.

As illustrated in FIG. 7, in the case where the trailing edge of the recording material S has passed through the fixing nip portion N1 (STEP S9: YES), the control unit 300 judges whether or not the length of the recording material S in the conveyance direction is equal to or longer than a predetermined length (STEP S21). The predetermined length is the distance from the fixing unit 8 to the after-conveyance roller unit 601. Based on the information regarding the recording material S input from the operation unit 80, the control unit 300 judges whether or not the length of the recording material S in the conveyance direction is equal to or longer than the predetermined length.

In the case where the length of the recording material S in the conveyance direction is shorter than the predetermined length (STEP S21: NO), the control unit returns the cooling conveyance speed to the first nominal speed (STEP S10). This process is similar to the first embodiment described above, and, since the cooling conveyance speed is returned to the first nominal speed (time t9 in FIG. 6), the recording material S which is conveyed next is conveyed while being pulled by the first belt 21 from the fixing unit 8, so that it is possible to make it unlikely to generate the loop in the recording material S between the fixing unit 8 and the cooling unit 310.

On the other hand, in the case where the length of the recording material S in the conveyance direction is longer than the predetermined length (STEP S21: YES), the control unit 300 changes the cooling conveyance speed to a third nominal speed (STEP S22). Then, when the trailing edge of the recording material S has passed through the cooling nip portion N2 (STEP S23), the control unit 300 returns the cooling conveyance speed from the third nominal speed to the first nominal speed (STEP S10). Thereby, as illustrated in FIG. 8, for the duration of a period (time t9 to t10) from the passage of the trailing edge of the recording material S through the fixing nip portion N1 to the passage of the trailing edge of the recording material S through the cooling nip portion N2, the cooling conveyance speed is set at the third nominal speed. The third nominal speed is, for example, 435 mm/s, and is a speed slower than the fixing conveyance speed (also the same for the after-conveyance speed) and faster than the second nominal speed.

As described above, for the duration of the period from the passage of the trailing edge of the recording material S through the fixing nip portion N1 to the passage of the trailing edge of the recording material S through the cooling nip portion N2, in short, for the duration of a period when the recording material S is not nipped by the fixing unit 8 but nipped by the cooling unit 310 and the after-conveyance roller unit 601, the cooling conveyance speed is set at the speed slower than the after-conveyance speed. That is, the cooling conveyance speed does not become faster than the after-conveyance speed in the timing when the trailing edge of the recording material S has passed through the fixing nip portion N1, but the cooling conveyance speed becomes faster than the after-conveyance speed in the timing when the trailing edge of the recording material S has passed through the cooling nip portion N2. Thereby, in the case where the length of the recording material S in the conveyance direction is longer than the distance from the fixing unit 8 to the after-conveyance roller unit 601, it is possible to make it unlikely to generate the loop in the recording material S between the cooling unit 310 and the after-conveyance roller unit 601.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-051436, filed on Mar. 28, 2022, which is hereby incorporated by reference herein in its entirety.

What is claimed is:

1. An image forming apparatus comprising:

an image forming unit configured to form a toner image on a recording material;

a fixing unit configured to nip and convey the recording material on which the toner image has been formed by the image forming unit while applying heat and pressure to the recording material so as to fix the toner image on the recording material, the fixing unit including a rotary member pair configured to form a first nip portion;

a cooling unit disposed downstream of the fixing unit in a conveyance direction of the recording material, the cooling unit being configured to form a second nip portion cooling the recording material, on which the toner image has been fixed by the fixing unit, by nipping and conveying the recording material;

a drive unit configured to drive the cooling unit;

an obtaining unit configured to obtain information regarding torque of the drive unit; and a control unit configured to control the drive unit based on the information, wherein in a state where the recording material is nipped by the first nip portion and the second nip portion, if the information is equal to or less than a threshold value, the control unit is configured to set a conveyance speed of the cooling unit at a first speed larger than a conveyance speed of the fixing unit, and, wherein in the case where the recording material is nipped by the first nip portion and the second nip portion, if the information is larger than the threshold value, the control unit is configured to set the conveyance speed of the cooling unit at a second speed smaller than the first speed of the cooling unit.

2. The image forming apparatus according to claim 1, further comprising:

a conveyance unit disposed downstream of the cooling unit in the conveyance direction, the conveyance unit being configured to form a third nip portion, wherein the control unit is configured to control a conveyance speed of the conveyance unit.

3. The image forming apparatus according to claim 2, wherein, in a case where a length of the recording material having reached the first nip portion is smaller than a distance between the first nip portion and the third nip portion, the control unit is configured to set the conveyance speed of the conveyance unit at the first speed, and wherein, in a case where the length of the recording material having reached the first nip portion is equal to or larger than the distance between the first nip portion and the third nip portion, the control unit is configured to set the conveyance speed of the conveyance unit at same as the conveyance speed of the fixing unit.

4. The image forming apparatus according to claim 3, wherein, in the case where the length of the recording material having reached the first nip portion is equal to or larger than the distance between the first nip portion and the third nip portion, in response to a passage of a trailing edge of the recording material through the first nip portion, the control unit is configured to set the conveyance speed of the cooling unit at a third speed, and wherein the third speed is smaller than the conveyance speed of the fixing unit and larger than the second speed.

5. The image forming apparatus according to claim 1, wherein, in the state where the recording material is nipped by the first nip portion and the second nip portion, if the information becomes less than the threshold value after having exceeded the threshold value, the control unit is configured to set the conveyance speed of the cooling unit being slower than the conveyance speed of the fixing unit.

6. The image forming apparatus according to claim 1, wherein, in response to a passage of a trailing edge of the recording material through the first nip portion, the control unit is configured to set the conveyance speed of the cooling unit at the first speed.

7. The image forming apparatus according to claim 1, wherein the cooling unit includes a pair of belts.

8. The image forming apparatus according to claim 7, wherein the cooling unit includes a heat sink and a fan.

9. The image forming apparatus according to claim 8, wherein the cooling unit includes a plurality of rollers configured to come into contact with inner circumferential surfaces of the pair of belts.

10. The image forming apparatus according to claim 1, wherein the drive unit includes a motor, and the information includes an electrical current value flowing in the motor.

11. The image forming apparatus according to claim 2, wherein the conveyance unit includes a roller pair, and the roller pair is configured to form the third nip portion.

12. The image forming apparatus according to claim 1, the conveyance speed of the cooling unit at a second speed smaller than the conveyance speed of the fixing unit.

* * * * *